(12) United States Patent
Asami

(10) Patent No.: US 9,343,001 B2
(45) Date of Patent: May 17, 2016

(54) DISPLAY DEVICE USING A DISPLAY PANEL WHICH PREVENTS IMAGE DISTORTION

(75) Inventor: Tomonobu Asami, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 118 days.

(21) Appl. No.: 13/386,449

(22) PCT Filed: Jun. 15, 2010

(86) PCT No.: PCT/JP2010/060130
§ 371 (c)(1),
(2), (4) Date: Jan. 23, 2012

(87) PCT Pub. No.: WO2011/010517
PCT Pub. Date: Jan. 27, 2011

(65) Prior Publication Data
US 2012/0119977 A1    May 17, 2012

(30) Foreign Application Priority Data

Jul. 24, 2009  (JP) .................................. 2009-172796

(51) Int. Cl.
*G09F 9/40* (2006.01)
*G06F 3/14* (2006.01)
(Continued)

(52) U.S. Cl.
CPC ................ *G09F 9/40* (2013.01); *G06F 3/1446* (2013.01); *G09F 3/204* (2013.01); *G09F 9/35* (2013.01);
(Continued)

(58) Field of Classification Search
CPC ............. G09G 3/36; G09G 5/00; G09G 5/34; G06F 15/16; G06F 9/455; G06T 1/00; G06T 15/00
See application file for complete search history.

(56) References Cited

U.S. PATENT DOCUMENTS 5,657,046 A * 8/1997 Noble et al. .................. 345/684
6,104,414 A * 8/2000 Odryna et al. ............... 345/536
(Continued)

FOREIGN PATENT DOCUMENTS

| CN | 101414431 A | 4/2009 |
|---|---|---|
| JP | 8-211849 A | 8/1996 |

(Continued)

OTHER PUBLICATIONS

Matrox: "Matrox Monitor Bezel Management TripleHead2Go Digital Edition" XP-055028038, Jun. 5, 2008 http://www.matrox.com/graphics/surroundgaming/media/en/pdf/Matrox_Monitor_bezel_Management_White_Paper.pdf, 8 pages.
(Continued)

*Primary Examiner* — Kent Chang
*Assistant Examiner* — Sujit Shah
(74) *Attorney, Agent, or Firm* — Oblon, McClelland, Maier & Neustadt, L.L.P.

(57) ABSTRACT

A display device has liquid crystal display panels aligned in a horizontal scan direction. The liquid crystal display panels constitute one virtual display area. A decoder decodes image data, to thereby generate pieces of pixel data having addressees corresponding to the virtual display area. A bridge circuit specifies a target (display destination) on which the pixel data is to be displayed on the basis of a parameter table indicating a correspondence between the virtual display area and each of display areas of the liquid crystal display panels. The pixel data are stored in line buffers corresponding to the specified display destinations and outputted to the liquid crystal display panels. Out of the pixel data, pixel data corresponding to a gap formed between two liquid crystal display panels are discarded.

10 Claims, 12 Drawing Sheets

(51) Int. Cl.
  *G09F 3/20* (2006.01)
  *G09F 9/35* (2006.01)
  G09G 5/38 (2006.01)
  G03B 21/28 (2006.01)
  G09G 5/36 (2006.01)
  G09G 5/00 (2006.01)

(52) U.S. Cl.
  CPC *G03B 21/28* (2013.01); *G09G 5/00* (2013.01); *G09G 5/36* (2013.01); *G09G 5/38* (2013.01); *G09G 2300/026* (2013.01); *G09G 2320/068* (2013.01); *G09G 2380/04* (2013.01)

(56) References Cited

U.S. PATENT DOCUMENTS

| | | | |
|---|---|---|---|
| 8,537,166 B1* | 9/2013 | Diard et al. | 345/502 |
| 2003/0142064 A1* | 7/2003 | Wang et al. | 345/156 |
| 2007/0229767 A1* | 10/2007 | Ikeda et al. | 353/28 |
| 2008/0024419 A1* | 1/2008 | Goto et al. | 345/98 |
| 2008/0297523 A1* | 12/2008 | Tsukagoshi | 345/530 |
| 2008/0301675 A1* | 12/2008 | Cromer et al. | 718/1 |
| 2009/0096711 A1* | 4/2009 | Jang et al. | 345/1.3 |
| 2010/0328615 A1* | 12/2010 | Ikeda et al. | 353/28 |
| 2011/0205500 A1 | 8/2011 | Ikeda et al. | |

FOREIGN PATENT DOCUMENTS

| | | | |
|---|---|---|---|
| JP | 2001 100683 | 4/2001 | |
| JP | 2003 066933 | 3/2003 | |
| JP | 2003 180494 | 7/2003 | |
| JP | 2003-224788 A | 8/2003 | |
| JP | 2003 330382 | 11/2003 | |
| JP | 2005 227579 | 8/2005 | |
| JP | 2005227579 A * | 8/2005 | G09G 5/00 |
| JP | 2006 343380 | 12/2006 | |
| JP | 2007 289636 | 11/2007 | |

OTHER PUBLICATIONS

Matrox: "Matrox DTH2Go Bezel Management-WSGF Review", XP-055028040, Oct. 28, 2007, http://www.youtube.com/watch?v=ZxRRA-aGHBI, 1 page.
U.S. Appl. No. 13/387,444, filed Jan. 27, 2012, Asami.
International Search Report issued on Jul. 27, 2010 in PCT/JP10/060130 filed on Jun. 15, 2010.

* cited by examiner

DISPLAY AREA OF LIQUID CRYSTAL DISPLAY PANEL

DISPLAY AREA OF VIRTUAL PANEL (VIRTUAL DISPLAY AREA)

IMAGE DATA 30

CIRCLE 301 AND RIGHT TRIANGLE 302 ARE SIMPLY DIVIDED

GAP CORRECTION IS PERFORMED

CORRESPONDENCE BETWEEN IMAGE DATA 30 AND GAP

FIG. 9

PARAMETER TABLE                                              70

| | START X ADDRESS | END X ADDRESS |
|---|---|---|
| DISPLAY AREA 110a (LIQUID CRYSTAL DISPLAY PANEL 11a) | 1 | 320 |
| DISPLAY AREA 110b (LIQUID CRYSTAL DISPLAY PANEL 11b) | 361 | 680 |
| DISPLAY AREA 110c (LIQUID CRYSTAL DISPLAY PANEL 11c) | 721 | 1040 |

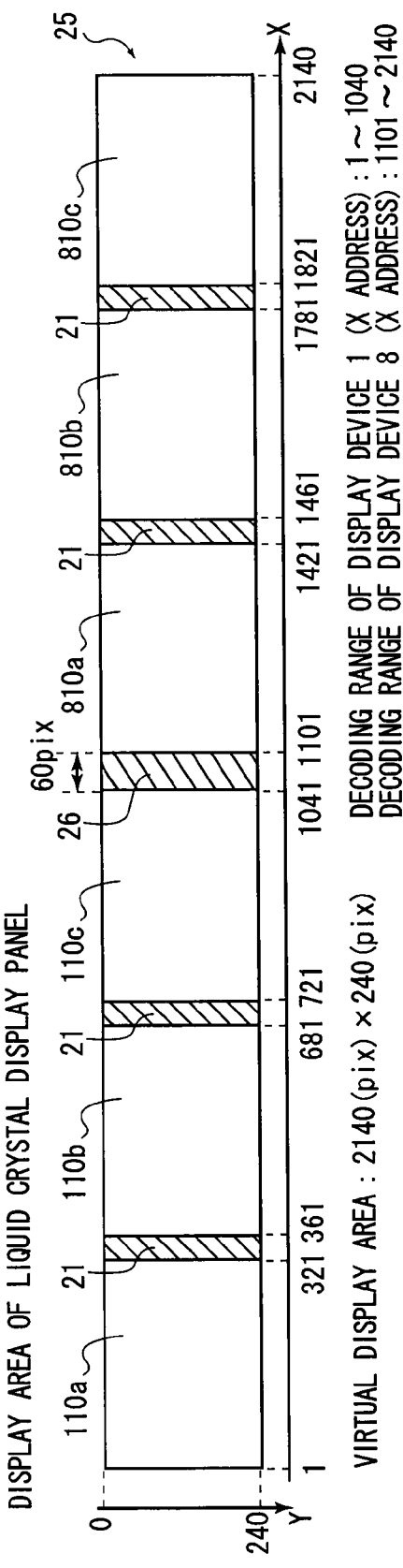

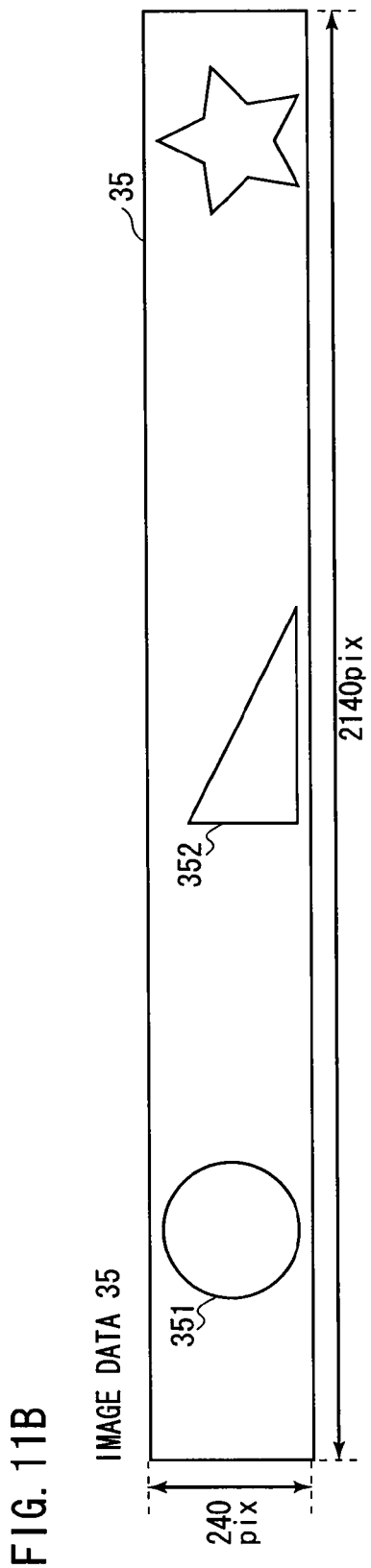

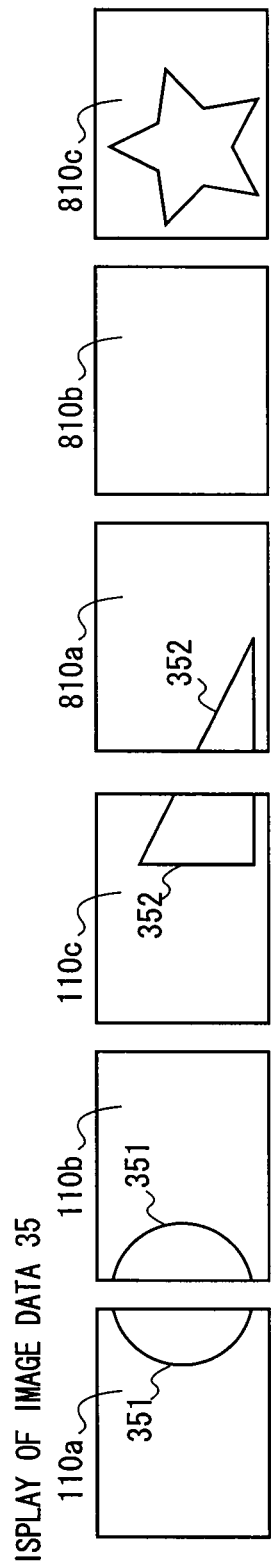

DISPLAY DEVICE USING A DISPLAY PANEL WHICH PREVENTS IMAGE DISTORTION

TECHNICAL FIELD

The present invention relates to a display device using a thin display panel.

BACKGROUND ART

In retail stores such as supermarkets, convenience stores, and the like, generally, display racks are placed in the stores and commercial goods are displayed on the display racks. Further, for the purpose of sales promotion of the goods displayed on the display racks, a technique called "electronic POP (Point Of Purchase)" has been conventionally used.

[Patent Document 1] Japanese Patent Application Laid Open Gazette No. 2001-100683

[Patent Document 2] Japanese Patent Application Laid Open Gazette No. 2007-289636

Patent Document 1 discloses an electronic POP apparatus using a thin display panel such as a liquid crystal display panel or the like. In the electronic POP apparatus disclosed in Patent Document 1, an advertising video image is displayed on the liquid crystal display panel or the like by reproducing moving image data or the like stored in a storage medium. For using the electronic POP apparatus of Patent Document 1, however, another space for setting the electronic POP apparatus is needed separately from the space for displaying the commercial goods.

Patent Document 2 discloses a display rack on which a video image for electronic POP can be displayed. A projector is set inside the display rack and a transmission screen is attached to a front surface of a shelf board on which the commercial goods are placed. An advertising video image is displayed entirely on the display rack by displaying the advertising video image projected from the projector on the screen. The display rack of Patent Document 2 allows display of the advertising video image thereon, not requiring any space for setting an electronic POP apparatus, and it is thereby possible to efficiently use the salesrooms in the retail stores.

DISCLOSURE OF INVENTION

The present invention is intended for a display device. According to the present invention, the display device comprises a plurality of display panels, a pixel information generation part for generating pixel information corresponding to a virtual display area constituted of the plurality of display panels by decoding image data, a correspondence information storage part for storing correspondence information indicating a correspondence between the virtual display area and an individual display area of each of the display panels, and a display panel specification part for specifying a display panel which displays pixel information inputted from the pixel information generation part on the basis of the correspondence information and outputting the inputted pixel information on the specified display panel.

Since the display device can be manufactured without additionally manufacturing any display panel which is suited to a limited space such as a front surface of a shelf board of a display rack or the like, it is possible to reduce the cost for the display device.

According to another preferred embodiment, the plurality of display panels include a first display panel and a second display panel which are adjacent to each other, and the display panel specification part includes a determination part for determining whether or not the inputted pixel information is information corresponding to a gap area sandwiched between an individual display area of the first display panel and an individual display area of the second display panel on the basis of the correspondence information; and a pixel information discarding part for discarding the inputted pixel information when the inputted pixel information is information corresponding to the gap area.

It is thereby possible to prevent a video image displayed in the virtual display area from being distorted by the presence of the gap area and display the video image which gives viewers less feeling of strangeness.

Therefore, it is an object of the present invention to provide a display device which can be set in a limited space such as a front surface of a display rack or the like and facilitates reduction in the cost.

These and other objects, features, aspects and advantages of the present invention will become more apparent from the following detailed description of the present invention when taken in conjunction with the accompanying drawings.

BRIEF DESCRIPTION OF DRAWINGS

[FIG. 9] is a view showing an example of a parameter table;

[FIG. 11A] is a view showing a display area of a virtual panel;

[FIG. 11B] is a view showing image data corresponding to the virtual panel; and

[FIG. 11C] is a view showing the image data displayed on the virtual panel.

BEST MODE FOR CARRYING OUT THE INVENTION

{The First Preferred Embodiment}
<Appearance and Attachment of Display Device 1>

Figure 1:
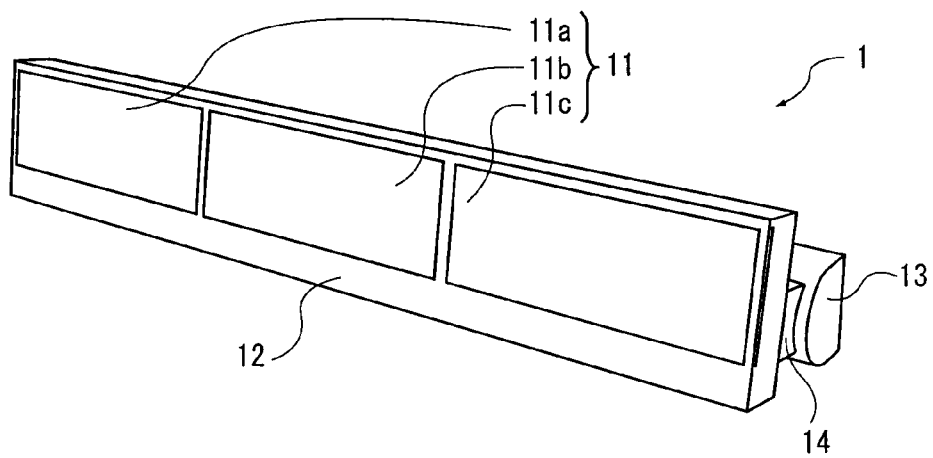
[FIG. 1] is a perspective view of a display device in accordance with a first preferred embodiment.

Hereinafter, with reference to figures, the preferred embodiments of the present invention will be discussed. FIG. 1 is a perspective view of a display device 1 in accordance with the first preferred embodiment of the present invention. The display device 1 can be used as an electronic POP (Point Of Purchase) apparatus. The display device 1 comprises liquid crystal display panels 11a, 11b, and 11c, a housing 12, an attachment part 13, and a tilt control part 14.

The liquid crystal display panels 11a to 11c are general-purpose small-sized liquid crystal panels aligned in a horizontal scan line direction and have the same constitution. The liquid crystal display panels 11a to 11c constitute one virtual panel and display an image as a whole. In the first preferred embodiment, the liquid crystal display panels 11a to 11c do not individually display any image. In the following description, a set of liquid crystal display panels 11a to 11c is referred to as a liquid crystal display panel 11.

Since the liquid crystal display panels 11a to 11c each have an outer border such as an outer frame or the like, the virtual panel has gaps in which no image can be displayed. A video image displayed on the virtual panel is sometimes seen distorted due to the presence of the gaps. Then, the display device 1 corrects the distortion of the video image displayed on the virtual panel by performing gap correction. The gap correction will be discussed later in detail.

The housing 12 accommodates a control part 15 (see FIG. 6) of the liquid crystal display panel 11 and fixes the liquid crystal display panels 11a to 11c on the same plane. The attachment part 13 fixes the display device 1. The tilt control part 14 controls the orientation of the display surface of the liquid crystal display panel 11.

Figure 2:
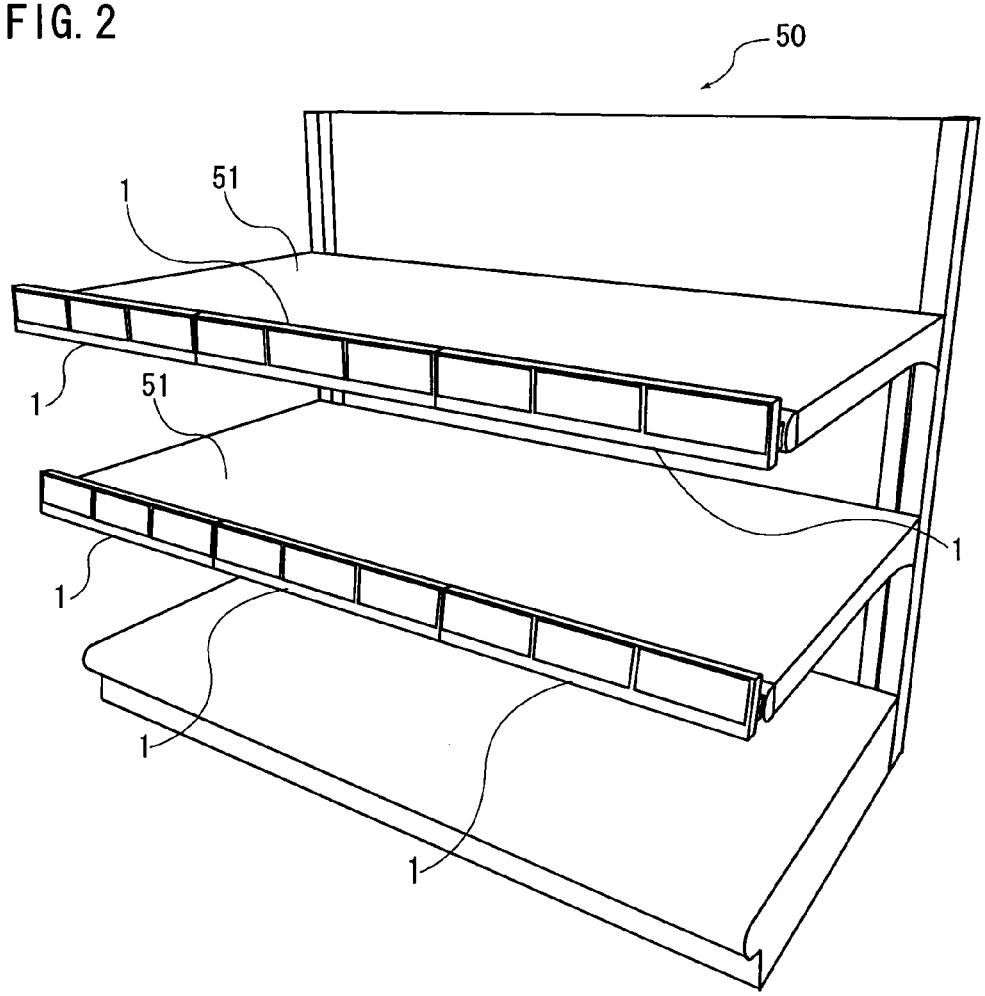
[FIG. 2] is a view showing an exemplary use of the display device.

FIG. 2 is a view showing an exemplary use of the display device 1. The display device 1 is attached to a front surface of a shelf board 51 of a display rack 50 which is used for display of commercial goods. The display device 1 attached to the front surface of the shelf board 51 displays an advertising video image or the like of the goods placed on the display rack 50.

In the display device 1, in order to suit to a limited space such as the front surface of the shelf board 51 or the like, a plurality of liquid crystal display panels 11a to 11c constitute a virtual panel. Therefore, since the display device 1 does not need to use any liquid crystal display panel suited to the size of the front surface of the shelf board 51, it is thereby possible to achieve substantial reduction in the cost.

Figure 3A:
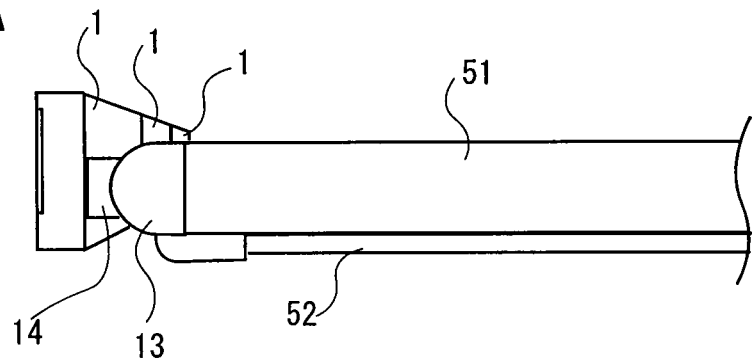
[FIG. 3A] is a view showing a state where a display surface of the display device is vertically oriented.
Figure 3B:
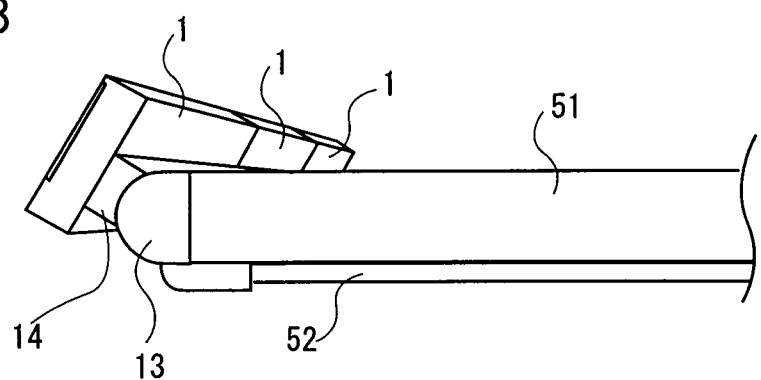
[FIG. 3B] is a view showing a state where the display surface of the display device is oriented obliquely upward.

FIGS. 3A and 3B are views showing operations of the tilt control part 14. By using the tilt control part 14, the display device 1 can change the orientation of a display surface of the liquid crystal display panel 11. A wiring 52 is used to supply power to the display device 1.

A user can also manually change the orientation of the display surface. Further, the tilt control part 14 may automatically control the orientation of the display surface on the basis of an angle set by the user.

FIG. 3A is a view showing a state where the display surface of the display device 1 is vertically oriented. The display surface is controlled to be horizontally oriented, for example, when the display device 1 is attached to the shelf board 51, the vertical level of which is almost equal to the vertical level of the line of sight of a customer.

FIG. 3B is a view showing a state where the display surface of the display device 1 is oriented obliquely upward. The display surface is oriented obliquely upward, as shown in FIG. 3B, in a case where the display device 1 is attached to a lower shelf board 51 of the display rack 50, or in the like case. Further, when the display device 1 is attached to a higher position, the orientation of the display surface can be controlled to be oriented obliquely downward.

The viewing angle of the liquid crystal display panels 11a to 11c is generally small. The display device 1, however, can control the orientation of the display surface thereof, as shown in FIGS. 3A and 3B. Since the display device 2 allows a customer standing in front of the display rack 50 to see a clear video image regardless of the attachment position thereof, it is possible to increase the effect of sales promotion.

<Overview of Virtual Panel>

Figure 4A:
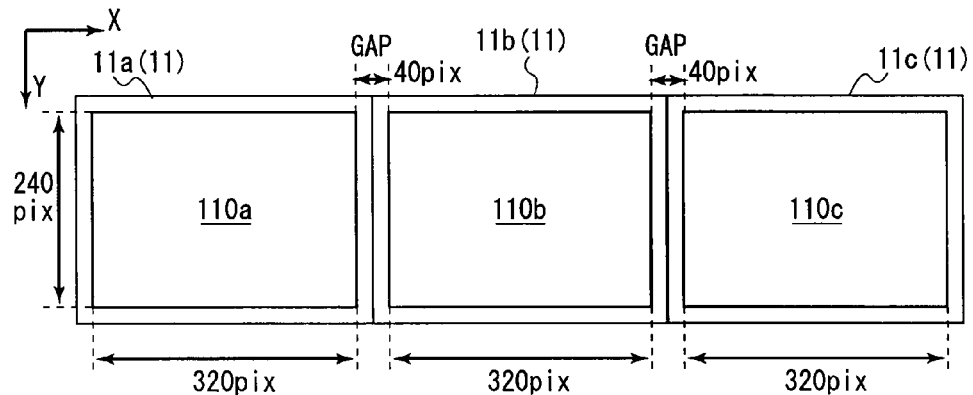
[FIG. 4A] is a view showing a display area of a liquid crystal display panel.

Next, detailed description will be made on the virtual panel constituted of the liquid crystal display panels 11. FIG. 4A is a view showing a display area of the liquid crystal display panel 11.

As shown in FIG. 4A, the liquid crystal display panels 11a to 11c are aligned adjacently to one another in a horizontal scan direction (X direction). The size of each of display areas 110a, 110b, and 110c of the liquid crystal display panels 11a, 11b, and 11c, respectively is 320 pixels in the X direction by 240 pixels in a vertical scan direction (Y direction).

Figure 4B:
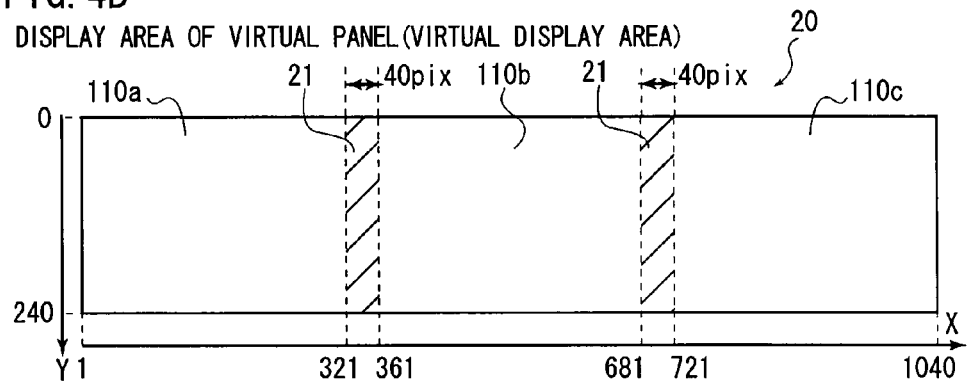
[FIG. 4B] is a view showing a display area of a virtual panel.

FIG. 4B is a view showing a display area (hereinafter, referred to as a "virtual display area") 20 of the virtual panel. The virtual display area 20 is constituted of the display areas 110a to 110c and gaps 21 and 21. The gaps 21 are an area sandwiched between the display area 110a and the display area 110b and an area sandwiched between the display area 110b and the display area 110c. The gap 21 corresponds to the outer frame or the like of each of the display panel 11a to 11c, where no video image can be displayed. The width of the gap 21 in the X direction is assumed to be 40 pixels. The virtual display area 20 has a size of 1040 pixels in the X direction by 240 pixels in the Y direction.

Figure 4C:
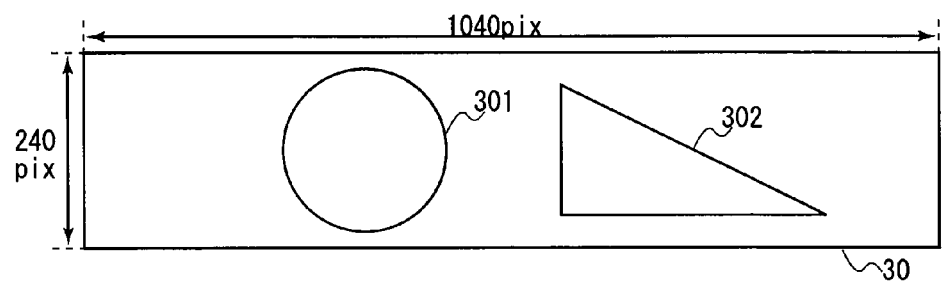
[FIG. 4C] is a view showing image data corresponding to the virtual panel.

FIG. 4C is a view showing image data 30 to be displayed in the virtual display area 20. The size of the image data 30 corresponds to the size of the virtual display area 20 (1040× 240 pixels). In the image data 30, a circle 301 and a right triangle 302 are drawn. A user of the display device 1 stores the image data 30 which is an advertising video image data in a storage part 151 (see FIG. 6) in advance.

<Overview of Gap Correction>

Next, an overview of gap correction will be discussed. When the image data 30 is displayed in the virtual display area 20, the data is divided in the X direction and displayed in the display areas 110a to 110c. When the image data 30 is simply divide and displayed in the display areas 110a to 110c, however, the image data 30 displayed in the virtual display area 20 has distortion.

Figure 5A:
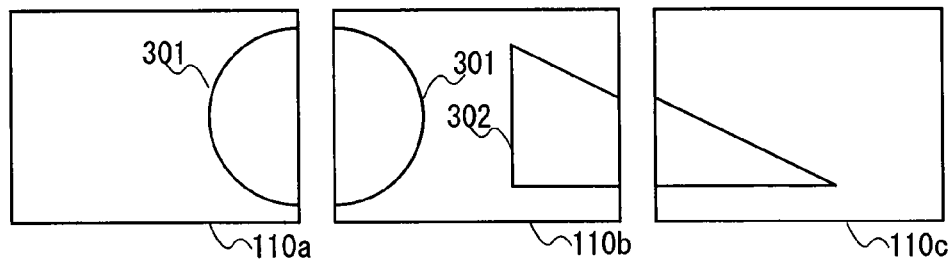
[FIG. 5A] is a view showing a state where the image data is displayed while being simply divided.

FIG. 5A is a view showing a state where the circle 301 and the right triangle 302 drawn in the image data 30 are simply divided and displayed in the display areas 110a to 110c. In this case, the circle 301 is displayed as semicircles in the display areas 110a and 110b, respectively. Since the gap 21 is present between the display area 110a and the display area 110b, customers see the circle 301 displayed in the virtual display area 20 as an ellipse. Similarly, when the right triangle 302 is simply divided and displayed in the display areas 110b and 110c, the customers see the right triangle 302 displayed in the virtual display area 20 in a sawlike shape.

When the image data 30 is simply divided and displayed thus in the display areas 110a to 110c, there is a possibility that the customers may have a feeling of strangeness. Especially when the image data 30 is moving image data, the distortion is enhanced.

Then, the display device 1 performs gap correction when the image data 30 is displayed in the virtual display area 20. The gap correction is a process for inhibiting data out of the image data 30, which is located in an area corresponding to the gap 21, from being displayed in any one of the display areas 110a to 110c. The display device 1 can thereby display a video image which gives the customers less feeling of strangeness.

Figure 5B:
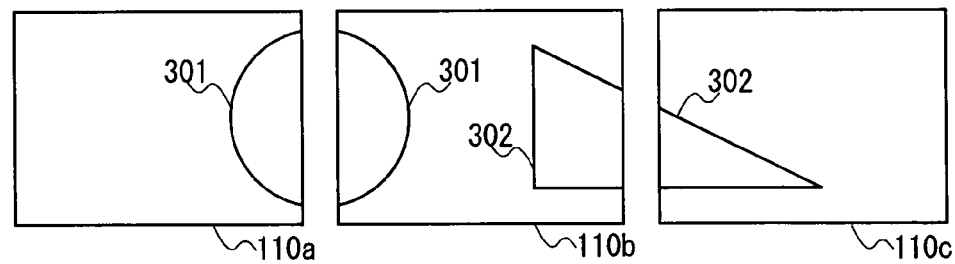
[FIG. 5B] is a view showing a state where the image data is displayed while being subjected to gap correction.
Figure 5C:
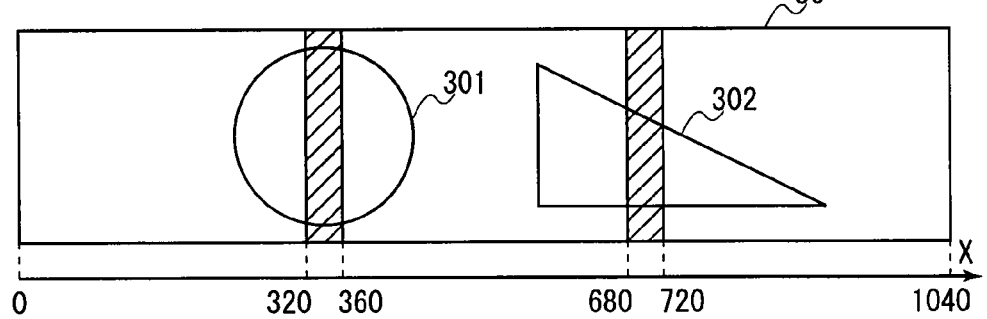
[FIG. 5C] is a view showing areas which are not displayed on the liquid crystal display panel as the result of the gap correction.

FIG. 5B is a view showing the image data 30 displayed in the virtual display area 20, after being subjected to the gap correction. FIG. 5C is a view showing areas which correspond to the gaps 21. As the result of the gap correction, the areas hatched in FIG. 5C are not displayed in any one of the display areas 110a to 110c. As a result, by virtue of the visual effect, the customers can know by analogy, that the circle 301 displayed in the display areas 110a and 110b with the gap 21 sandwiched therebetween is an original shape (circle). Further, the customers can know by analogy, that the right triangle 302 displayed in the display areas 110b and 110c with the gap 21 sandwiched therebetween is an original shape (right triangle). Therefore, in the display device 1, it is possible to suppress the distortion of the image data 30 displayed in the virtual display area 20 and display a video image which gives viewers less feeling of strangeness.

<Functional Constitution of Display Device 1>

Figure 6:
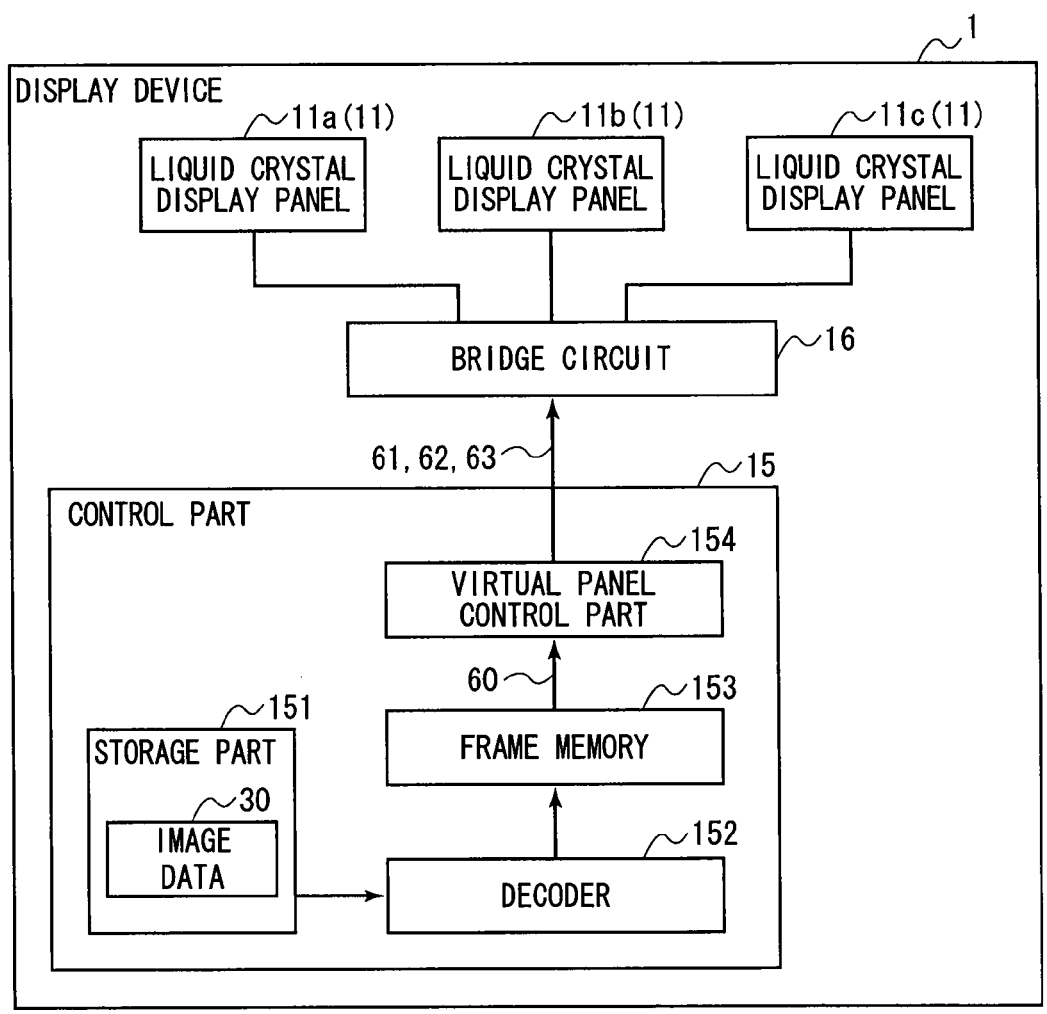
[FIG. 6] is a block diagram showing a functional constitution of the display device.

FIG. 6 is a block diagram showing a functional constitution of the display device 1. The display device 1 comprises a control part 15 and a bridge circuit 16. The control part 15 and the bridge circuit 16 are provided as an IC (Integrated Circuit) in the housing 12.

The control part 15 generally controls the display device 1. The control part 15 comprises a storage part 151, a decoder 152, a frame memory 153, and a virtual panel control part 154.

The storage part 151 is a flash memory or the like and stores the image data 30 therein. The image data 30 may be moving image data or still image data. The control part 15 may be provided with a memory card slot, instead of the storage part 151. In this case, a memory card in which the image data 30 is recorded is inserted into the memory card slot.

The decoder 152 decodes the image data 30, to thereby generate frame data 60 to be displayed in the virtual display area 20. The frame data 60 is a set of pieces of pixel data 61 corresponding to addresses of the virtual display area 20.

The frame memory 153 stores therein the frame data 60 generated by the decoder 152.

The virtual panel control part 154 reads the frame data 60 out from the frame memory 153 and sequentially outputs the pieces of pixel data 61 included in the frame data 60 to the bridge circuit 16. The virtual panel control part 154 outputs a virtual panel control signal 62 and a pixel clock 63 to the bridge circuit 16 in synchronization with the output of the pixel data 61. The virtual panel control signal 62 includes a horizontal synchronizing signal and a vertical synchronizing signal which are used for controlling the display of the virtual panel. The pixel clock 63 is a clock signal in synchronization with the input of the pixel data 61.

The virtual panel control part 154 controls the single virtual panel constituted of the liquid crystal display panels 11a to 11c and does not individually control the liquid crystal display panels 11a to 11c. The virtual panel control part 154 has only to have a function of controlling a liquid crystal display panel having a size which corresponds to the size of the virtual panel. Therefore, as the virtual panel control part 154, an LCD (Liquid Crystal Display) controller for controlling a general-purpose liquid crystal display panel can be used, and it is thereby possible to reduce the parts cost of the display device 1.

The bridge circuit 16 specifies a target (display destination) on which the pixel data 61 outputted from the virtual panel control part 154 are to be displayed and outputs the pixel data 61 to the target. The bridge circuit 16 further performs the gap correction.

Figure 7:
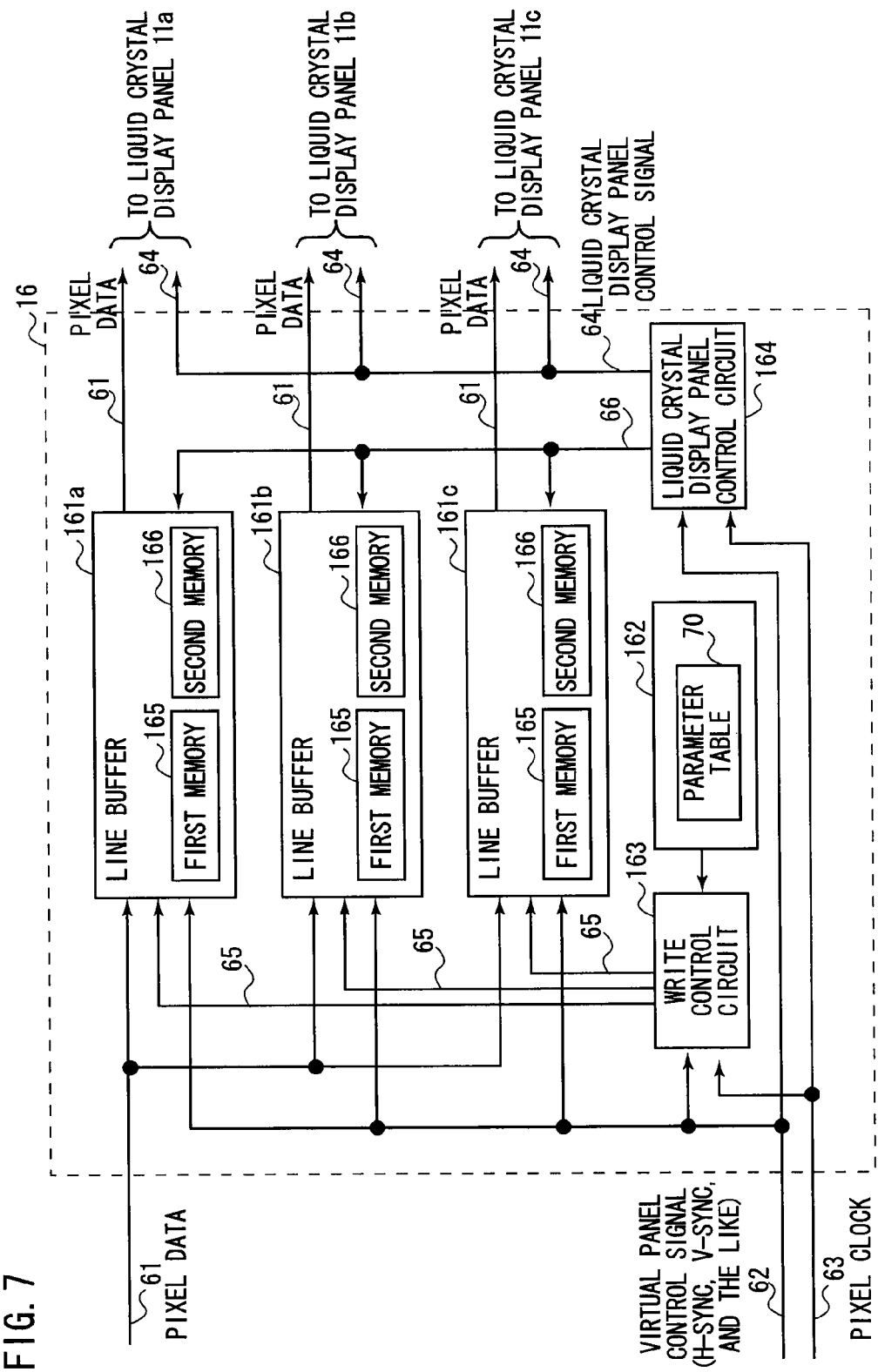
[FIG. 7] is a block diagram showing a functional constitution of a bridge circuit.

FIG. 7 is a block diagram showing a functional constitution of the bridge circuit 16. The bridge circuit 16 comprises line buffers 161a, 161b, and 161c, a parameter table storage part 162, a write control circuit 163, and a liquid crystal display panel control circuit 164.

The line buffers 161a to 161c are provided correspondingly to the liquid crystal display panels 11a to 11c, respectively, and store therein the pixel data 61 corresponding to the display areas 110a to 110c, respectively. The line buffers 161a to 161c each include a first memory 165 and a second memory 166. The first memory 165 and the second memory 166 are FIFO (First In First Out) memories. Either one of the first memory 165 and the second memory 166 is used for writing of the pixel data 61 outputted from the control part 15. The other one is used for reading of the pixel data 61 written in the line buffer, in order to output the pixel data 61 to the liquid crystal display panel 11.

The parameter table storage part 162 stores therein a parameter table 70 indicating a correspondence between the addresses of the virtual display area 20 and the display areas 110a to 110c.

The write control circuit 163 specifies a line buffer into which the inputted pixel data 61 is to be written, on the basis of the parameter table 70. The write control circuit 163 commands the specified line buffer to write the inputted pixel data 61 therein.

The liquid crystal display panel control circuit 164 outputs the pixel data 61 written in the line buffers 161a to 161c to the liquid crystal display panel 11. The pixel data 61 is outputted in synchronization with a liquid crystal display panel control signal 64 for controlling each of the liquid crystal display panels 11.

<Operation of Bridge Circuit 16>

Figure 8:
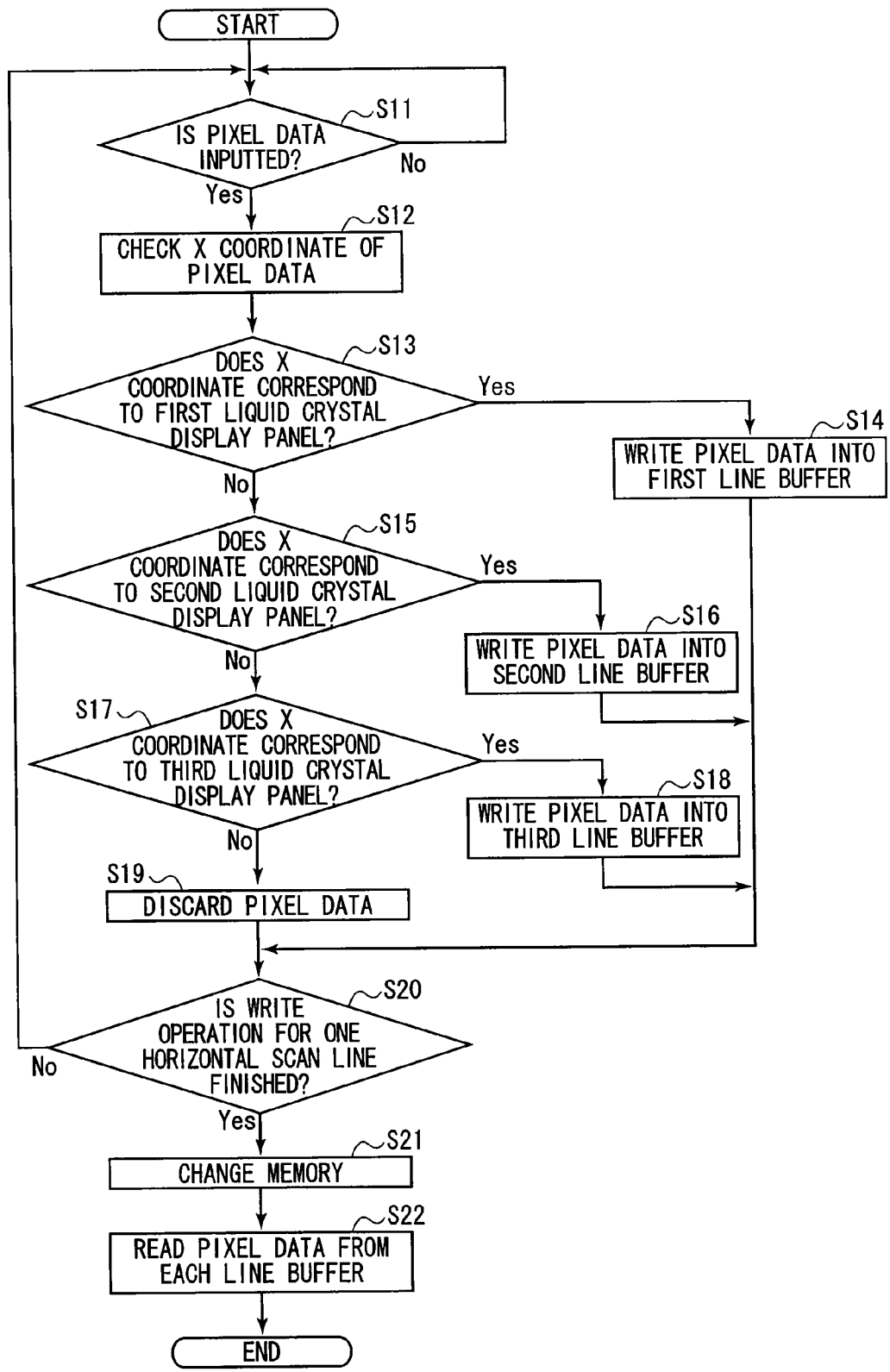
[FIG. 8] is a flowchart showing an operation of the bridge circuit.

FIG. 8 is a flowchart showing an operation of the bridge circuit 16. In FIG. 8, a first liquid crystal panel, a second liquid crystal panel, and a third liquid crystal panel corresponds to the liquid crystal display panels 11a, 11b, and 11c, respectively. A first line buffer, a second line buffer, and a third line buffer corresponds to the line buffers 161a, 161b, and 161c, respectively.

With the input of the horizontal synchronizing signal (H-Sync), the bridge circuit 16 starts an operation shown in the flowchart of FIG. 8. It is assumed herein that the first memory 165 is determined as a memory for writing data in each of the line buffers 161a to 161c.

When the pixel data 61 is inputted ("Yes" in Step S11), the write control circuit 163 checks the X address of the inputted pixel data 61 (Step S12). The X address of the pixel data 61 corresponds to the virtual display area 20. The write control circuit 163 counts up the pixel clock 63 from the time when the horizontal synchronizing signal is inputted. The count value of the pixel clock 63 is used as the X address of the inputted pixel data 61 in the virtual display area 20.

The write control circuit 163 determines whether or not the X address of the inputted pixel data 61 corresponds to the display area 110a, on the basis of the parameter table 70 (Step S13).

FIG. 9 is a view showing an example of the parameter table 70. The parameter table 70 indicates a correspondence between the display areas 110a to 110c and the X addresses of the virtual display area 20. The X addresses of the virtual panel corresponding to the display area 110a are "1" to "320". The X addresses of the virtual panel corresponding to the display area 110b are "361" to "680". The X addresses of the virtual panel corresponding to the display area 110c are "721" to "1040". The X addresses ("321" to "360" and "681" to "720") corresponding to the gap 21 in the virtual display area 20 are not set in the parameter table 70.

When the X address of the inputted pixel data 61 corresponds to the display area 110a ("Yes" in Step S13), the inputted pixel data 61 is written into the first memory 165 of the line buffer 161a (Step S14). Specifically, a write enable signal 65 is inputted from the write control circuit 163 to the line buffer 161a. In response to the input of the write enable signal 65, the line buffer 161a writes therein the inputted pixel data 61. At that time, the line buffers 161b and 161c do not write therein the pixel data 61.

When the X address of the inputted pixel data 61 does not correspond to the display area 110a ("No" in Step S13), it is determined whether or not the X address of the inputted pixel data 61 corresponds to the display area 110b (Step S15). When the X address of the inputted pixel data 61 corresponds to the display area 110b ("Yes" in Step S15), the inputted pixel data 61 is written into the first memory 165 of the line buffer 161b (Step S16).

When the X address of the inputted pixel data 61 does not correspond to the display area 110b ("No" in Step S15), it is determined whether or not the X address of the inputted pixel data 61 corresponds to the display area 110c (Step S17). When the X address of the inputted pixel data 61 corresponds to the display area 110c ("Yes" in Step S17), the inputted pixel data 61 is written into the first memory 165 of the line buffer 161c (Step S18).

When the X address of the inputted pixel data 61 does not correspond to the display area 110c ("No" in Step S17), the write control circuit 163 determines that the inputted pixel data 61 corresponds to the gap 21 and discards the inputted pixel data 61 (Step S19). In other words, since the inputted pixel data 61 does not corresponds to any one of the display areas, the pixel data 61 is not written into any one of the line buffers 161a to 161c.

When writing of the pixel data 61 for one horizontal scan line of the virtual display area 20 is not finished ("No" in Step S20), the process steps S11 to S20 are repeated. On the other hand, when writing of the pixel data 61 for one horizontal scan line of the virtual display area 20 is finished ("Yes" in Step S20), the first memory 165 of each of the line buffers is changed from the memory for writing to the memory for reading (Step S21). At the same time, the second memory 166 of each of the line buffers is changed from the memory for reading to the memory for writing.

The liquid crystal display panel control circuit 164 outputs a read enable signal 66 to the line buffers 161a to 161c. In response to this, the pieces of pixel data 61 are outputted from the respective first memories 165 of the line buffers 161a to 161c to the liquid crystal display panels 11a to 11c, respectively (Step S22). Since the first memories 165 are FIFO memories, each of the line buffers 161a to 161c sequentially outputs the pieces of pixel data 61 from the pixel data 61 having the smallest X address of the virtual display area 20 (the pixel data 61 which is first written into the first memory 165).

The pixel data 61 is outputted from the first memory 165 in synchronization with the liquid crystal display panel control signal 64. The liquid crystal display panel control signal 64 includes the horizontal synchronizing signal, the vertical synchronizing signal, the pixel clock, and the like of the liquid crystal display panels 11a to 11c. Since the liquid crystal display panels 11a to 11c have the same configuration, the liquid crystal display panel control circuit 164 has only to generate a single control signal to be used commonly to the liquid crystal display panels 11a to 11c. By using the liquid crystal display panels 11a to 11c having the same configuration, it is possible to simplify the control of the liquid crystal display panels 11a to 11c. The present invention, however, does not limit the use of the liquid crystal display panels 11a to 11c having different configurations.

Concurrently with the output of the pixel data 61 from the line buffers 161a to 161c to the liquid crystal display panels 11a to 11c, respectively, the bridge circuit 16 performs the operation shown in the flowchart of FIG. 8. Specifically, concurrently with the reading of the pixel data 61 from the first memory 165, the pixel data 61 for the next horizontal scan line is written into the second memory 166 of any one of the line buffers 161a to 161c. Since each of the line buffers 161a to 161c has a double buffer configuration, it is possible to suppress the delay in the display of the image data 30 which is caused by the write operation and the read operation in the line buffer.

Though the bridge circuit 16 successively determines whether or not the inputted pixel data 61 corresponds to one of the liquid crystal display panels 11a to 11c (Steps S13, S15, and S17) in the operation of FIG. 8, this is only one exemplary case. The bridge circuit 16 can perform a process in which whether or not the pixel data 61 corresponds to one of the liquid crystal display panels 11a to 11c is not successively determined, by taking advantage of the input of the pixel data 61 in the order of the X address of the virtual display area 21.

Specifically, when the input of the pixel data 61 is started, the bridge circuit 16 checks that the X address of the pixel data 61 is "1" with reference to the parameter table 70. The pixel data 61 having the X address of "1" to the pixel data 61 having the X address of "320" are written into the line buffer 161a. When it is found that the X address of the pixel data 61 is "321" or more, the bridge circuit 16 determines the data as the pixel data 61 corresponding to the gap 21 and discards the pixel data 61. At that time, the bridge circuit 16 does not successively execute the process steps S13, S15, and S17.

Subsequently, when it is found that the X address of the pixel data 61 is "361", writing of the pixel data 61 into the line buffer 161b is started. The pixel data 61 having the X address of "361" to the pixel data 61 having the X address of "680" are continuously written into the line buffer 161b. The bridge circuit 16 does not execute the process step (Step S13) for determining whether or not the pixel data 61 corresponds to the liquid crystal display panel 11a. Writing of the pixel data 61 into the line buffer 161c is also performed in the same manner. The above operation is effective when the writing of the pixel data 61 into the line buffers 161a to 161c is performed by a hardware circuit. By applying the above-discussed operation to the hardware circuit, it is possible to increase the efficiency of the writing of the pixel data 61 into the line buffers 161a to 161c and reduce the size of the hardware circuit.

As discussed above, in the display device 1 of the first preferred embodiment, the plurality of aligned liquid crystal display panels 11a to 11c constitute the virtual panel and one image data is thereby displayed on the virtual panel. This eliminates the necessity of manufacturing a liquid crystal display panel suited to the width of a display rack 50. Therefore, it is possible to achieve substantial reduction in the manufacturing cost of the display device 1.

The control part 15 uses the plurality of liquid crystal display panels 11a to 11c as a single virtual panel. Therefore, the display device 1 does not need to divide one image data 30 for the operation, and it is thereby possible to simplify the control of the liquid crystal display panels 11a to 11c.

By providing the tilt control part 14 in the display device 1, the orientation of the display surface of the liquid crystal display panel 11 can be controlled. Therefore, it is possible to control the orientation of the display surface of the liquid crystal display panel 11 so as to allow customers to easily see a video image. Since this allows the customers to see a clear video image, it is possible to increase the effect of sales promotion.

Though the case has been discussed where the display device 1 has three liquid crystal display panels 11a to 11c in the first preferred embodiment, this is only one exemplary case. In accordance with the width of a display rack 50, the display device 1 may have two liquid crystal display panels or three or more liquid crystal display panels.

Further, though the case has been discussed where the pixel data 61 is inputted to the bridge circuit 16 in synchronization with the pixel clock 63 in the first preferred embodiment, this is only one exemplary case. For example, the pixel data 61 may be inputted to the bridge circuit 16 together with address information of the virtual display area 20. In this case, the bridge circuit 16 determines which display area the pixel data 61 corresponds to, on the basis of the address information.

Though the case has been discussed where the liquid crystal display panels 11a to 11c in each of which the length of the horizontal scan line direction is longer than that of the vertical scan line direction are used in the first preferred embodiment, this is only one exemplary case. As the liquid crystal display panels 11a to 11c, liquid crystal display panels in each of which the length of the vertical scan line direction is longer than that of the horizontal scan line direction may be used. In this case, in order to form the virtual display area 20 shown in FIG. 4A, it is necessary to rotate each of the liquid crystal display panels 11a to 11c by 90 degrees and align the liquid crystal display panels 11a to 11c in the vertical scan line direction. As a result, the X address and the Y address of the virtual display area 21 are exchanged each other.

Therefore, the process of this case is different from that in the first preferred embodiment in the following points. The decoder 152 rotates the frame data 60 generated from the moving image data 35 by 90 degrees and writes the frame data 60 into the frame memory 153. Since the gap correction is performed in the vertical scan line direction, correspondence information indicating a correspondence between the display areas 110a to 110c and the Y addresses of the virtual display area 21 is recorded in the parameter table 70. Though the pixel data 61 is inputted to the bridge circuit 16 by one horizontal scan line like in the first preferred embodiment, it is not necessary to divide the pixel data 61 into the line buffers 161a to 161c in accordance with the X addresses thereof. Therefore, the bridge circuit 16 has only to have the line buffer 161a.

{The Second Preferred Embodiment}

Hereinafter, the second preferred embodiment of the present invention will be discussed. In the second preferred embodiment, a plurality of display devices constitute a virtual panel. Discussion will be made below, centering on the difference between the first and second preferred embodiments, and discussion of constitution and operation like those of the first preferred embodiment will be omitted.

Figure 10:
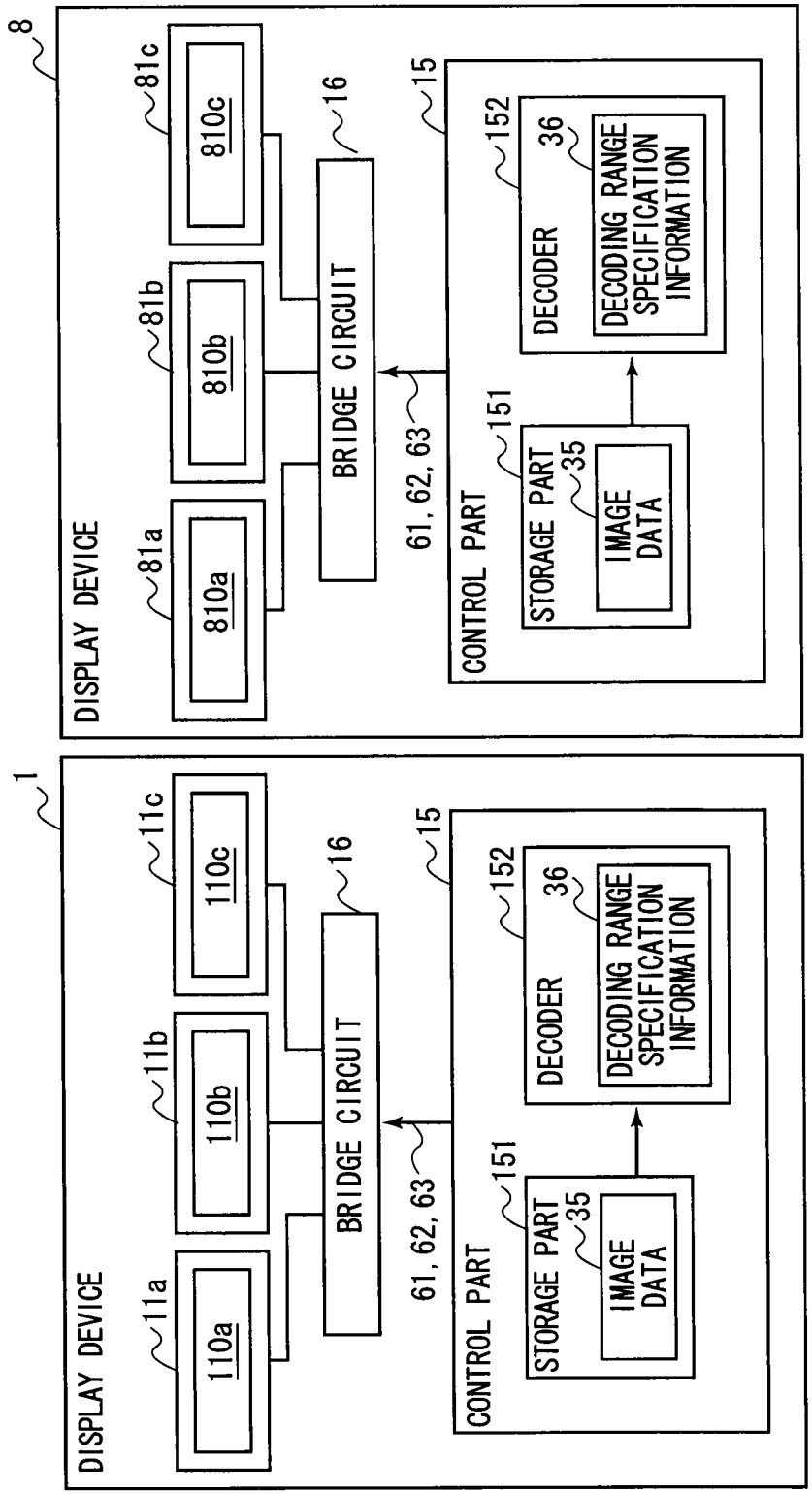
[FIG. 10] is a view showing functional constitution and arrangement of display devices in accordance with a second preferred embodiment.

FIG. 10 is a view showing constitution and arrangement of display devices 1 and 8 in accordance with the second preferred embodiment. The constitution of each of the display devices 1 and 8 is basically the same as that of the display device 1 of the above-discussed first preferred embodiment. In the control part 15, the constituent elements other than the storage part 151 and the decoder 152 are not shown.

The storage part 151 stores image data 35 therein, instead of the image data 30. The image data 35 is generated to have a size suited to a display area of a virtual panel constituted of the display devices 1 and 8. The decoder 152 holds decoding range specification information 36 used for specifying a decoding range of the image data 35.

The display device 1 comprises the liquid crystal display panels 11a to 11c. The display device 8 comprises liquid crystal display panels 81a to 81c. The display devices 1 and 8 are so arranged as to align the liquid crystal display panels 11a to 11c and 81a to 81c in the X direction (horizontal scan direction).

FIG. 11A is a view showing a display area (hereinafter, referred to as a "virtual display area") 25 of the virtual panel constituted of the display devices 1 and 8. The virtual display area 25 is constituted of the display areas 110a to 110c and 810a to 810c, gaps 21, 21, 21, and 21, and a device gap 26.

The virtual display area 25 has a size of 2140 pixels in the X direction by 240 pixels in the Y direction. The display device 1 corresponds to an area of the virtual display area 25, the X addresses of which are "1" to "1040" pixels. The display device 8 corresponds to an area of the virtual display area 25, the X addresses of which are "1101" to "2140" pixels. In the virtual display area 25, the device gap 26 formed by the display devices 1 and 8 is present, as well as the gaps 21 each of which is present between the adjacent two of the display areas 110a to 110c and 810a to 810c. The device gap 26 corresponds to an area having a width of 60 pixels in the X direction and X addresses of "1041" to "1100" pixels.

FIG. 11B is a view showing the image data 35 displayed in the virtual display area 25. Since the image data 35 is generated to be suited to the size of the virtual display area 25, the image data 35 has a size of 2140 pixels in the X direction by 240 pixels in the Y direction.

In order to display the image data 35 in the virtual display area 25, the display devices 1 and 8 decode the image data 35, to thereby generate the frame data 60 suited to a range specified by the decoding range specification information 36. In the display device 1, as the decoding range specification information 36, set are the addresses "1" to "1040" in the X direction. In the display device 8, as the decoding range specification information 36, set are the addresses "1101" to "2140" in the X direction. As a result, the image data 35 is displayed in the state of FIG. 11C.

Areas corresponding to the gaps 21 are not displayed in any one of the liquid crystal display panels 11a to 11c and 81a to 81c, as discussed in the first preferred embodiment.

An area corresponding to the device gap 26 (in a range of the X addresses from "1041" to "1100") is not displayed on any one of the display devices 1 and 8. This is because the X addresses corresponding to the device gap 26 are not specified in any one of the respective pieces of decoding range specification information 36 of the display devices 1 and 8. As a result, as shown in FIG. 11C, a right triangle 352 displayed in an area sandwiching the device gap 26 is displayed not in a sawlike shape but so as to cause viewers to know an original shape (right triangle) by analogy.

Thus, each of the display devices 1 and 8 decodes the area out of the image data 35 which is specified by the decoding range specification information 36 thereof, to thereby generate the pixel data 61, and displays the pixel data 61 on its part of the virtual panel. The decoding range specification information 36 is set in consideration of the device gap 26. Therefore, when the image data 35 is displayed in the virtual display area 25, it is possible to correct the distortion of the image data 35 caused by the device gap 26.

Though the case has been discussed where two display devices 1 and 8 are used in the second preferred embodiment, three or more display devices arranged on the front surface of the shelf board 51 may be used to constitute the virtual panel, as shown in FIG. 2. In the decoding range specification information 36 which the decoder 152 of each of the display devices 1, 1, . . . holds, a range of addresses of the virtual display area corresponding to each display device has only to be set.

Though the case has been discussed where the decoder 152 of each of the display devices 1 and 8 decodes the image data 35 on the basis of the decoding range specification information 36 in the second preferred embodiment, this is only one exemplary case. Each of the display devices 1 and 8 may hold the image data 35 corresponding to the display area thereof in the virtual display area 25. The display device 1 holds the image data 35 corresponding to the area having X addresses of "1" to "1040". The display device 8 holds the image data 35 corresponding to the area having X addresses of "1101" to "2140". In this case, the display devices 1 and 8 perform the same operation as that in the above-discussed first preferred embodiment. Since the data size of the image data 35 can be reduced, it is not necessary to use any high-capacity flash memory for the storage part 151. Therefore, it is possible to reduce the cost for the display devices 1 and 8.

Though the case has been discussed where a plurality of display devices arranged in the horizontal scan direction are used to display single image data 35 in the second preferred embodiment, this is only one exemplary case. For example, a plurality of display devices arranged in the vertical scan direction may be used to display one image data. By using six display devices 1 attached to the shelf boards 51 and 51 shown in FIG. 2, for example, one image data may be displayed. In this case, in order to specify a decoding range in the Y direction, an address range in the Y direction is specified in the decoding range specification information 36 of each of the display devices 1.

Further, in this case, an address range in the Y direction may be set in the decoding range specification information 36 of each of the display devices 1, in consideration of the device gap in the Y direction. It is thereby possible to suppress the distortion of the image due to the device gap in the Y direction.

The size of a gap present in the Y direction substantially corresponds to an interval between the shelf boards 51 and 51. For this reason, even performing the correction of the device gap in the Y direction does not always produce sufficient effect of suppressing the distortion of the video image in the Y direction by virtue of the visual effect. In such a case, when the address range in the Y direction is set, the device gap in the Y direction does not have to be taken into consideration. When the device gap in the Y direction is not taken into consideration, it is possible to reduce the data size of the image data 35 as compared with the case where the device gap in the Y direction is taken into consideration.

While the invention has been shown and described in detail, the foregoing description is in all aspects illustrative and not restrictive. It is therefore understood that numerous modifications and variations can be devised without departing from the scope of the invention.

The invention claimed is:

1. A display device, comprising:
   a plurality of display panels arranged in a horizontal scan line direction;
   a pixel information generation part configured to generate pixel data of a pixel contained in a virtual display area including individual display areas corresponding to the plurality of display panels and a gap area for displaying no image sandwiched between two adjacent ones of the individual display areas by decoding image data;
   a virtual panel control part configured to generate a virtual horizontal synchronizing signal and a virtual pixel clock used to control a single panel having a size of the virtual display area and synchronize pixel data of pixels contained in a virtual horizontal line which is one horizontal scan line of the virtual display area to the virtual horizontal synchronizing signal and the virtual pixel clock;
   a plurality of line buffers each provided for the corresponding one of the display panels;
   a correspondence information storage part configured to store correspondence information indicating a correspondence between the virtual display area and each of the individual display areas, the correspondence information indicating that pixel data of a pixel in the gap area is not displayed;
   a display panel specification part configured to acquire, from the virtual panel control part, the pixel data of the pixels contained in the virtual horizontal scan line synchronized to the virtual horizontal synchronizing signal and the virtual pixel clock together with the virtual horizontal synchronizing signal and the virtual pixel clock, specify, on the basis of the correspondence information and the acquired virtual horizontal synchronizing signal and the acquired virtual pixel clock, one of the plurality of display panels to which pixel data of one pixel contained in the virtual horizontal scan line in the virtual display area is to be outputted, and store the pixel data of the one pixel in the line buffer corresponding to the specified one of the display panels; and
   an output control part configured to output control information including a horizontal synchronizing signal and a pixel clock to the corresponding one of the display panels and a read enable signal to the line buffer so that the line buffer outputs the pixel data stored therein to every one of the display panels in synchronization with the output of the control information as pixel data of pixels in one horizontal scan line of this display panel each time the specification of pixel data of all pixels contained in the virtual horizontal scan line in the virtual display area is completed.

2. The display device according to claim 1, wherein
the plurality of display panels include a first display panel and a second display panel which are adjacent to each other, and
the display panel specification part includes:
   a determination part configured to determine pixel data of pixels corresponding to one of the gap areas sandwiched between an individual display area of the first display panel and an individual display area of the second display panel out of the pixel data of the pixels in one scan line on the basis of the correspondence information; and
   a pixel information discarding part configured to discard the pixel data of the pixels corresponding to the gap area.

3. The display device according to claim 2, wherein the determination part determines that pixel data of those pixels that are not to be displayed in any of the individual display areas of the display panels out of the pixel data of the pixels in the virtual horizontal line is the pixel data of the pixels to be displayed in said-the gap area.

4. The display device according to claim 1, wherein
the pixel information generation part includes a decoding range specification part configured to specify a range of the image data to be decoded, and
the pixel information generation part generates the pixel data by decoding the range of the image data which is specified by the decoding range specification part.

5. The display device according to claim 2, wherein the first display panel and the second display panel are adjacent to each other in a horizontal scan line direction of each of the display panels.

6. The display device according to claim 5, wherein
the number of horizontal scan lines of the display panels and the number of pixels of the display panels are equal, and
the respective control information outputted to the display panels is the same information.

7. The display device according to claim 1, further comprising:
a tilt control part configured to control an angle of display surfaces of the plurality of display panels.

8. The display device according to claim 1, wherein each of the display panels is a liquid crystal display panel.

9. A display device, comprising:
a plurality of display panels arranged in a horizontal scan line direction;
a memory configured to store correspondence information indicating a correspondence between a virtual display area and each of the individual display areas, the correspondence information indicating that pixel data of a pixel in the gap area is not displayed;
a plurality of line buffers each provided for a corresponding one of the display panels; and
circuitry configured to
generate pixel data of a pixel contained in a virtual display area including individual display areas corresponding to the plurality of display panels and a gap area for displaying no image sandwiched between two adjacent ones of the individual display areas by decoding image data,
generate a virtual horizontal synchronizing signal and a virtual pixel clock used to control a single panel having a size of the virtual display area and synchronize pixel data of pixels contained in a virtual horizontal line which is one horizontal scan line of the virtual display area to the virtual horizontal synchronizing signal and the virtual pixel clock,
specify, on the basis of the correspondence information and the virtual horizontal synchronizing signal and the virtual pixel clock, one of the plurality of display panels to which pixel data of one pixel contained in the virtual horizontal scan line in the virtual display area is to be outputted,
store the pixel data of the one pixel in the line buffer corresponding to the specified one of the display panels,
output control information including a horizontal synchronizing signal and a pixel clock to the corresponding one of the display panels, and
output to every one of the display pixel data stored in the line buffer in synchronization with the output of the control information for the corresponding one of the display panels as pixel data of pixels in one horizontal scan line of this display panel each time the specification of pixel data of all pixels contained in the virtual horizontal scan line in the virtual display area is completed.

10. A display method implemented on a display device having a plurality of display panels, a plurality of line buffers each provided for a corresponding one of the display panels and an output control part, comprising:
generating, via a processor, pixel data of a pixel contained in a virtual display area including individual display areas corresponding to the plurality of display panels and a gap area for displaying no image sandwiched between two adjacent ones of the individual display areas by decoding image data;
generating a virtual horizontal synchronizing signal and a virtual pixel clock used to control a single panel having a size of the virtual display area and synchronizing, via a processor, pixel data of pixels contained in a virtual horizontal line which is one horizontal scan line of the virtual display area to the virtual horizontal synchronizing signal and the virtual pixel clock;
storing, in a memory, correspondence information indicating a correspondence between the virtual display area and each of individual display areas of each of said display panels, the correspondence information indicating that pixel data of a pixel in the gap area is not displayed;
specifying, via the processor and on the basis of the correspondence information and the virtual horizontal synchronizing signal and the virtual pixel clock, one of the plurality of display panels to which pixel data of one pixel contained in the virtual horizontal scan line in the virtual display area is to be outputted;
storing the pixel data of the one pixel in the line buffer corresponding to the specified one of the display panels,
outputting control information including a horizontal synchronizing signal and a pixel clock to the corresponding one of the display panels from the output control part, and
outputting to every one of the display panels pixel data stored in the line buffer in synchronization with the output of the control information as pixel data of pixels in one horizontal scan line of this display panel each time the specification of pixel data of all pixels contained in the virtual horizontal scan line in the virtual display area is completed.

* * * * *